Feb. 23, 1943.  K. R. LARSON  2,312,104
TORQUE WRENCH
Filed Jan. 14, 1941  2 Sheets-Sheet 2
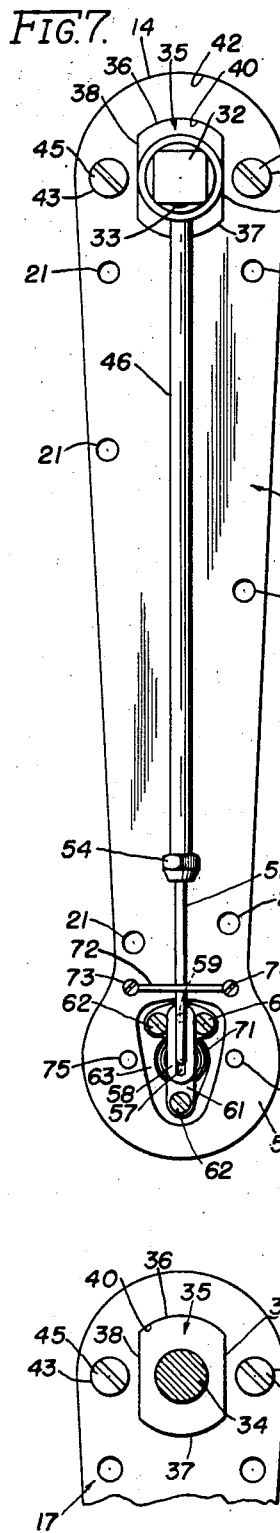
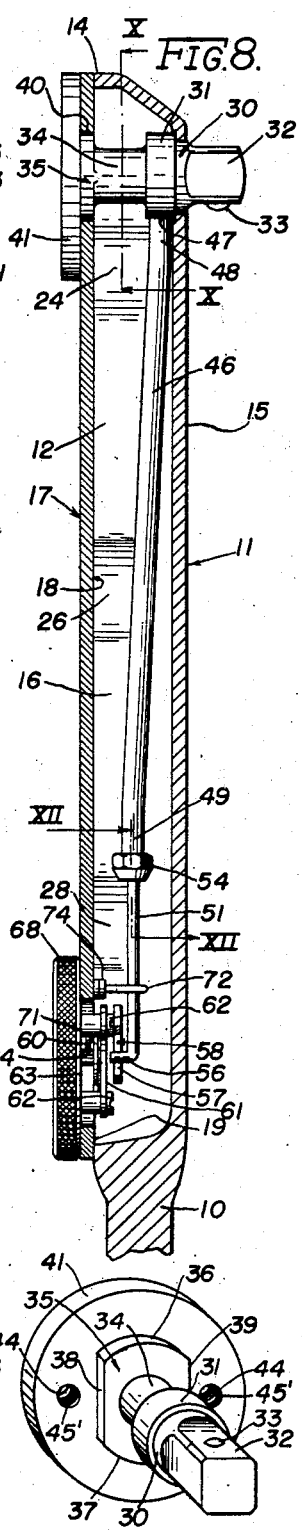
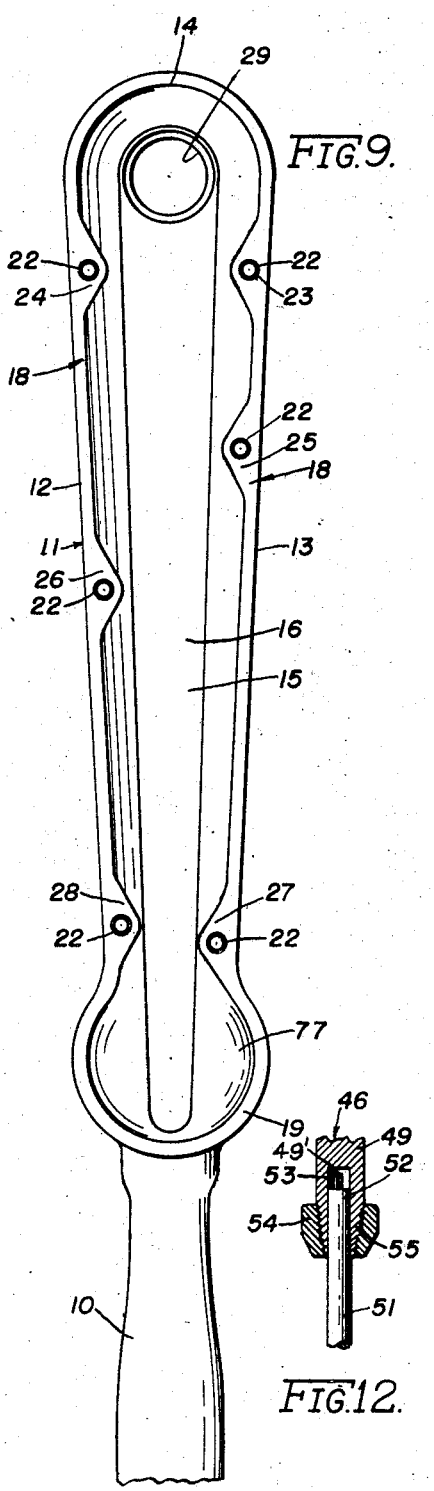
INVENTOR.
KENNETH R. LARSON.
BY
ATTORNEY.

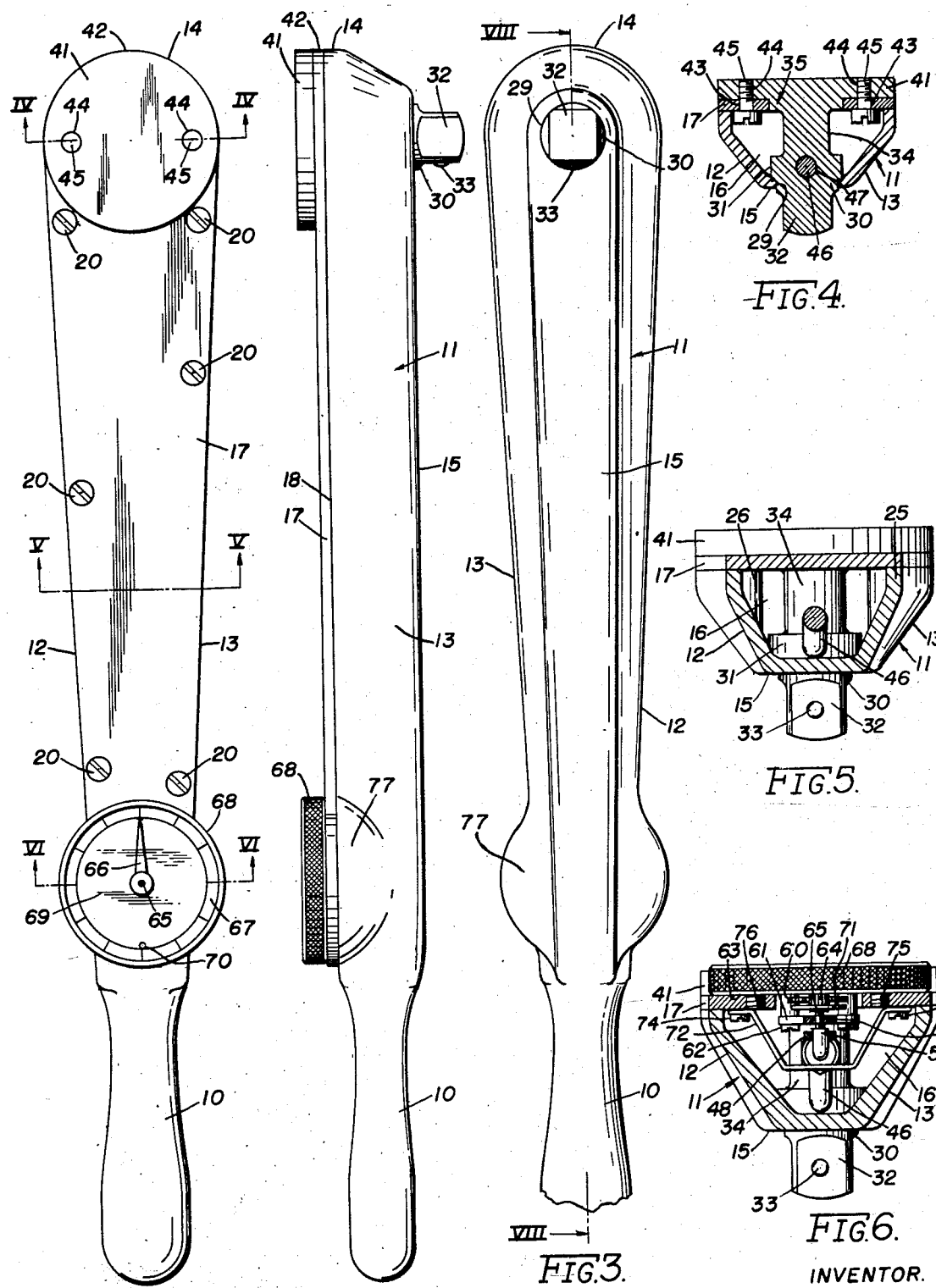

Patented Feb. 23, 1943

2,312,104

UNITED STATES PATENT OFFICE 2,312,104

TORQUE WRENCH

Kenneth R. Larson, Des Plaines, Ill., assignor to Snap-On Tools Corporation, Kenosha, Wis., a corporation of Delaware Application January 14, 1941, Serial No. 374,361

20 Claims. (Cl. 265—1)

This invention relates to turning devices and more particularly to torque measuring wrenches, although certain features thereof may be employed with equal advantage for other purposes.

It contemplates more especially the provision of a simple, dependable, accurate and compact torque measuring wrench that accurately designates the force applied in nut turning and similar movements under all conditions.

Most torque wrenches measure the flex in a beam which resists the turning force of a wrench in order to measure the amount of torque or force applied in nut turning and similar operations. Then, too, the amount of torque has been measured by determining the degree of twist in a shank or shaft. While some torque wrenches have embodied this principle, there has been no appreciable effort made to adapt such to commercial wrench structures of the conventional handle or lever arm type. The desirability of utilizing the degree of twist in the shank or shaft as the measuring expedient in nut turning and similar operations, has not been resorted to with the utmost advantage from the standpoint of translating the degree of twist to an indicator at a point of maximum displacement so that accurate measurements can be recorded by reducing the error factor to a minimum.

The importance of accuracy in torque wrenches cannot be over-emphasized, and the degree of accuracy depends largely upon the elimination of or substantial reduction in friction, lag and free-play between relatively moving parts. This is also important in torque wrenches that embody the principle of flexing a torque resisting beam to provide the desired reading; however, better results have been found possible in torsion type wrenches embodying teachings of the present invention. In accordance with the teachings of the present invention, the torsion measuring principle has been embodied in the conventional type lever-arm wrench with minimum friction, lag, free-play, and maximum translation of the relative twist of the load carrying member. Torque measurements are possible, therefore, with a negligible error factor and nut turning operations are accurately measured under all conditions and capacities irrespective of the position of applied force along the lever-arm for effecting the turning operation.

One object of the present invention is to simplify the construction and improve the operation of devices of the character mentioned.

Another object is to provide a simple and compact torque measuring wrench of the lever-arm type that is accurate and dependable in operation.

Still another object is to provide a torque measuring turning tool having improved torsion translating means associated therewith for measuring the torque applied in the turning operation.

A further object is to provide a turning tool with a shank subjected to twist for operating measuring instrumentalities with a translated twist effect for accuracy and dependability.

A still further object is to provide a torque wrench with a turning shank having a comparatively long indicating rod extending therefrom for operative connection to measuring instrumentalities at a point of accentuated displacement.

Still a further object is to provide a wrench having a rigid casing element for attachment of a turning shank subjected to turning movement to provide a calibrated twist therein through the medium of a light, flexible, and elongated rod connected to measuring instrumentalities at a point of greatest displacement responsive to torsional shank stresses and strains.

Other objects and advantages will appear from the following description of an illustrative embodiment of the present invention.

In the drawings:

Figure 1 is a plan view of a wrench embodying features of the present invention.

Figure 2 is a side view in elevation of the wrench shown in Figure 1.

Figure 3 is a bottom plan view of the wrench shown in Figure 1, part of the handle being broken away for convenience.

Figure 4 is a sectional view taken substantially along line IV—IV of Figure 1.

Figure 5 is a sectional view taken substantially along line V—V of Figure 1.

Figure 6 is a sectional view taken substantially along line VI—VI of Figure 1.

Figure 7 is a plan view of an underside of a casing cover plate and its assembled instrumentalities.

Figure 8 is a sectional view taken substantially along line VIII—VIII of Figure 3.

Figure 9 is a top view of the wrench shown in Figure 8 with the casing cover plate removed to illustrate the inner shape thereof.

Figure 10 is a fragmentary sectional view taken substantially along line X—X of Figure 8.

Figure 11 is a perspective view of a torsional turning shank element before being applied to the rigid casing cover plate.

Figure 12 is a fragmentary sectional view taken substantially along line XII—XII of Figure 8.

The structure selected for illustration comprises a solid handle member 10 of standard construction having an elongated chambered wrench shank or body 11 cast or otherwise shaped to present inclined side walls 12 and 13 terminating in a semi-circular top or head extremity 14. The handle 10 with its chambered body 11 is preferably though not essentially cast from an aluminum alloy so as to possess the desired strength and lightness for convenience and manipulation in nut turning as will appear more fully hereinafter. It will be observed that the handle shank or body 11 consists of the inclined side walls 12—13 which converge in the direction of the handle 10 and also toward the bottom wall 15 formed integral therewith to define an elongated chambered interior 16. It should be noted that, in this instance, the side walls 12—13 not only converge toward the handle 10 (Figures 1 and 9) but also toward the bottom 15 (Figures 3 and 9) to define a compact and well balanced casing or body 11.

The body or casing shank 11 is, in this instance, covered by a rigid steel plate 17 that is shaped to conform with the configuration of the peripherally flanged open side 18 opposite the bottom wall 15 to confront therewith and serve as a complement thereof. The lower or handle extremity 19 of the chamber 16 is of the same general size and semi-circular configuration as the head extremity 14. The peripherally flanged open edge 18 of the casing 11 extends around the side walls 12—13 and their semi-circular head and handle extremities 14 and 19. The rigid face or cover plate 17 is shaped to correspond with the flanged open edge 18 including its upper and lower semi-circular head and handle extremities 14 and 19 to serve as an enclosure therefor and a rigid turning arm to which the measuring instrumentalities are attached as will appear more fully hereinafter.

A plurality of threaded screw fasteners 20 project through apertures 21 in the rigid cover plate 17 to engage correspondingly threaded bores 22 in the peripheral casing edge 18 that extends along the side walls 12—13 of the handle shank or casing body 11 and semi-circular ends 14—19, thereby enclosing the chamber 16 and confining the torsion displacing, indicating, and measuring instrumentalities to be described hereinafter. It will be noted that the handle shank or casing body 11 and especially the inclined side walls 12—13 are reinforced in the region of the threaded bores 22 by increasing the thickness of the cast peripheral flange 18 as at 23—24, 25—26, and 27—28 so that the comparatively rigid and load carrying cover plate 17 can be effectively attached to the casing body 11 which is greatly strengthened and reinforced therewith.

In fact, the casing 11 does not sustain any appreciable turning load and primarily serves to confine the measuring instrumentalities as a protection against foreign substances and impacts. The cover plate 17 is sufficiently rigid to avoid a flex, distortion or consequential variation under turning load. The semi-circular head 14 of the body 11 is provided with a circular recess 29 corresponding substantially in curvature therewith and sized to receive a revoluble turning member 30 of substantially corresponding size for free rotation therein. The revoluble turning member 30 has an annular shoulder 31 formed, in this instance, integral therewith immediately above a polygonal wrench socket receiving extremity 32 which terminates beyond the bottom 15 of the casing shank 11 for projecting through the circular recess 29 provided in the head 14. A spring impelled detent 33 of standard construction is provided in a face of the polygonal shank 32 for cooperation with a correspondingly sized and shaped recess provided in a wrench socket or other turning implement that is telescoped thereon for retention thereon against accidental detachment.

Wrench sockets or other turning implements (not shown) would normally be provided with a recessed shank shaped and sized to conform with the polygonal extremity 32 of the revoluble turning member 30 so that the friction exerted by the spring impelled detent 33 would be effective in retaining the turning implement thereon against accidental removal. As shown, the revoluble member 30 has a cylindrical extension 34 constituting a turning shank which, in this instance, is formed integral with the annular shoulder 31 and polygonal shank 32 in axial relation therewith. The cylindrical turning shank 34 terminates in an enlarged polygonal shoulder 35 having, in this instance, opposing circular edges 36—37 interrupted by straight parallel sides 38—39 for registry with a correspondingly shaped aperture 40 provided in the head region of the cover plate 17. Obviously, the shoulder 35 may be of any polygonal shape depending upon the dictates of commercial practice.

The polygonal shoulder 35 has an enlarged circular disc 41 formed integral therewith in axial relation to the revoluble turning member 30 to rest, in this instance, upon the exterior surface of the cover plate 17 and to conform in size and circular configuration with a semi-circular head extremity 42 of the cover plate 17. So that the revoluble turning member 30 may be attached to the cover plate 17 to constitute a fixed element thereof, the cover plate 17 and the disc 41 of the revoluble turning member 30 are each, in this instance, provided with a pair of aligned apertures 43 and 44, respectively.

As shown, the apertures 44 in the disc 41 are interiorly threaded as at 45' (Figure 11) to receive fasteners such as threaded studs 45 having their heads disposed on the underside of the cover plate 17 (Figure 7). The studs 45 project through the apertures 43 in the cover plate 17 and threadedly engage the correspondingly threaded apertures 44 of the disc 41. The disc 41 is exteriorly disposed adjacent the cover plate 17 so that the polygonal shoulder 35 registers with the correspondingly shaped aperture 40 provided in the cover plate 17. With this arrangement, the turning member 30 projects through the chamber 16 of the body shank 11 so that the polygonal extremity 32 will be exteriorly accessible beyond the casing bottom 15 for engagement and disengagement with turning members such as wrench sockets and the like. Should commercial practice so dictate, the polygonal shoulder 35 may be dispensed with and the turning member 30 attached to the cover plate 17 against turning therewith by means of a plurality of fasteners 45.

It should be noted that the revoluble turning member 30 is rigidly attached to the cover plate 17 that is preferably of rigid and non-yielding material such as steel while the body or casing shank 11 may be cast or otherwise shaped from aluminum in that the revoluble turning member 30 is mounted for movement relative thereto in sustaining the turning load. The casing 11 does not directly carry any appreciable load.

Turning movement is imparted to a fastener such as a threaded nut through a wrench socket attached to the polygonal shank 32 of the revoluble turning member 30, responsive to manually applying force or effort to the handle 10 in one direction or another.

In order to measure the extent to which any fastener such as a threaded nut is applied through the manipulation of the handle 10, the extent of twist sustained by the cylindrical extension 34 of the revoluble turning member 30 is determined in that this will be uniform for any predetermined applied force and will vary proportionately to the turning load imparted through the handle 10 that is primarily sustained by the rigid cover plate 17. It will be observed that owing to the polygonal shoulder 35 on the disc 41 of the revoluble member 30 and the attachment thereof to the cover plate 17 through the medium of the fasteners 45, any turning movement applied to the handle 10 will be transferred to the cover plate 17 which, in turn, will rotarily displace the revoluble turning member 30 which carries a nut or other turning implement to the end that proportional twist is imparted to the cylindrical extension 34 anchored to the cover plate 17 at one extremity 41 and free to twist at the other extremity 32 responsive to carrying the turning load.

In order to measure the degree of twist or torsion imparted to the cylindrical extension 34 of the revoluble member 30 responsive to any turning operation, an elongated cylindrical indicator displacing rod 46, is in this instance of uniform diameter, and projects radially in the annular shoulder 31 of the revoluble member 30 as at 47 for fixed engagement to constitute a single acting unit or member therewith. The elongated rod 46 projects longitudinally of the body or casing shank 11 for confinement therein. So that the casing shank 11 together with its associated instrumentalities may be as compact as possible, the cylindrical indicator displacing rod 46 is preferably disposed at a slight angle betwen the extremities 48 and 49 thereof (Figure 8) to avoid contact with either the bottom 15 or cover plate 17 and free to circumferentially move or oscillate for a limited extent depending upon the degree of twist imparted to the revoluble member extension 34 or the torsion effect therein responsive to carrying the turning load and its polygonal shoulder 35.

The elongated indicator displacing rod 46 need only be heavy enough to overcome the friction in the measuring instrumentalities and the load occasioned by their operation without causing any flex in the rod 46. Its diametrical size, however, may be determined by other factors such as the elimination of backlash and conditions of abuse in actual nut turning operations. For that reason, the elongated rod 46 in actual practice may be somewhat heavier than otherwise required merely to carry a comparatively negligible load of operating the measuring instrumentalities without any flex in the rod 46.

It may be more desirable from a manufacturing standpoint to terminate the elongated cylindrical rod 46 just short of a lower circular handle extremity 50 of the cover plate 17 and join therewith a rod extension 51 of comparatively smaller diameter. To this end, the rod extension 51 has its upper extremity 52 projecting within an axial bore 53 provided in the lower extremity of the rod 46. The upper extremity 52 of the rod extension 51 is frictionally engaged in the bore 53 by means of a tapered tightening nut 54 that threadedly engages a correspondingly tapered and lower extremity 55 of the rod 46 to effect rigid connection of the rod extension 51 with the elongated cylindrical actuating rod 46 for the measuring instrumentalities (Figure 12). The lower extremity 49 of the rod 46 is provided with longitudinal slits 49' in the region of the axial bore 53 to provide the desired contractual resiliency responsive to tightening the nut 54.

With this arrangement, the rod extension 51 may be extended or retracted within the axial bore 53 of the rod 46 to enable longitudinal adjustment of the rod extension 51 relative to the indicator mechanism to be hereinafter described. The longitudinal adjustment of the rod extension 51 will vary the extent to which the dial mechanism is actuated or displaced responsive to a predetermined torsional stress imparted to the shank 34 of the work engaging member 33. This enables also the replacement of the rod extension 51 should occasion demand or should such become impaired in any nut turning operation. It should be noted that the rod 46 together with its reduced extension 51 functions exactly the same even though these were turned or otherwise shaped to constitute an integral unit; however, such construction would be somewhat more expensive from a production standpoint than the co-axial connected rods 46—51 serving as an actuator for measuring instrumentalities when displaced by the twist imparted to the turning member shank 34.

The reduced rod extension 51 has a right angularly offset extremity 56 which projects transversely within the casing body chamber 16 near the bottom end thereof for registry in a longitudinally elongated slot 57 provided in a lever 58 that comprises a part of measuring and indicating instrumentalities to be presently described. The lever 58 is secured at one extremity thereof to a stub shaft 59 that carries a gear sector 60. The stub shaft 59 is journalled in a substantially T-shaped bracket 61 that is mounted by means of threaded studs 62, in this instance three, to a circular dial casing plate 63.

The gear sector 60 meshes with a pinion 64 mounted on a stud shaft 65 journalled between the substantially T-shaped bracket 61 and the dial casing plate 63. The pinion stud shaft 65 projects through the dial casing plate 63 to carry an indicator pointer 66 attached thereto to confront an offset surface of the dial plate 63. The dial casing plate 63 has a calibrated dial 67 attached thereto to designate in foot pounds the degree of twist or torsional effect exerted on the revoluble turning extension 34 in fastening a nut or other expedients by proper engaging attachment with the polygonal shank 32 while the manual force is applied to the handle 10. It should be observed that the offset extremity 56 of the rod extension 51 will be displaced within the elongated slot 57 of the dial mechanism lever 58 responsive to longitudinally adjusting the rod extension 51 relative to the rod 46. This variation in the position of the rod extension offset extremity 56 within the slot 57 of the lever 58, will enable the correct setting or resetting of the dial mechanism for any particular load. This will readily insure accuracy by the simple adjustment and positioning of the rod extension 51 relative to the rod 46.

The calibrated dial 67 is confined within a narrow dial ring 68 which cooperates with the dial casing plate 63 to constitute an exterior confining member for the pinion shaft 65, the indicator pointer 66 and the calibrated dial 67. A suitable transparent dial cover 69 is secured to the dial casing ring 68 to confine and serve as protection for the dial indicator 66 and the calibrated dial 67. The starting position of the dial indicator 66 may be set relative to a pin 70 serving as a stop that is anchored in the dial casing plate 63 to project through the calibrated dial 67. The indicator as shown is of a known type and is preferably of a type in which the dial may be rotated for setting.

The measuring instrumentalities described herein are returned to their initial position after the revoluble turning member 30 has been released from its load or nut turning operation, by means of a small spiral spring 71 that envelops the pinion and indicator carrying shaft 65 to normally urge or return the indicator instrumentalities to initial position. It should be noted that the angularly offset extremity 56 is maintained in registry with the slot 57 of the lever 58 by means of a substantially U-shaped wire retainer bracket 72 that is anchored at its extremity by means of threaded studs 73—74 to the underside of the cover plate 17 (Figure 7) to maintain the actuator rod 46 and its extension 51 in operating connection with the measuring instrumentalities.

The measuring instrumentalities which are assembled as a unit to the dial casing plate 63 are attached to the exterior surface of the lower circular extremity 50 of the cover plate 17 which is provided, in this instance, with a pair of apertures 75—76 for receiving threaded studs therethrough to engage correspondingly spaced and threaded apertures (not shown) provided in the casing plate 63. Consequently, the measuring and indicator mechanism can be attached to the cover plate 17 together with the revoluble member 30 and its torsion displacing rod 46—51. The cover plate 17 together with these instrumentalities are, in turn, attached for confinement in the chamber 16 of the body or casing shank 11 by means of fasteners such as the threaded studs 20.

It should be observed that the lower end of the chamber 16 of the body casing 11 is outwardly flared to define a circularly flared configuration 77 to conform with the size and shape of the lower extremity 50 of the cover plate 17 together with the dial casing plate 63 and its confronting ring 68. It will be apparent from the foregoing arrangement of parts that a manual turning force applied to the handle 10 will impart a corresponding turning effect to the revoluble turning member 30. This creates a slight twist in the turning member extension or shank 34 which can be measured with the advantage procured through the moment arm dial indicator displacing member 46 therebetween.

This turning operation is transmitted to a suitable fastener or tool or implement or fastener such as a threaded nut which requires a predetermined turning load in securing it to the desired degree of tightness for the suitable performance of its intended function. This turning movement and sustained turning load will create a fractional twist in the revoluble member shank or extension 34 between its annular shoulder 31 and the polygonal stationary shoulder 35. This fractional twist created by the torsional effect on the cylindrical extension 34, will be translated to the measuring instrumentalities culminating in the rotary displacement of the pointer 66 relative to the calibrated dial 67 through the medium of the elongated rod 46—51. The degree of twist or torsional strain within the turning member shank 34 is measured at the extreme end of the elongated rod 46—51 which is the point of its greatest displacement.

As a result, the rod 46—51 will accentuate the twist created in the revoluble head extension 34 to effect its return to the indicator pointer to an extent proportional to the length of the elongated rod 46—51. The measurement of the twist imparted to the revoluble head extension 34 at a point of maximum displacement of the comparatively long twist-translating rod 46—51 is an important factor in producing accurate readings. Then, too, the rod 46—51 need only be heavy enough to overcome the comparatively negligible force required to actuate the measuring instrumentalities so that comparatively little friction is encountered between the revoluble turning member 30 and the measuring instrumentalities. This is conducive to accuracy accomplished with utmost simplicity in construction and operation.

With the arrangement of parts above described, the rod 46—51 comprising a single or sectional member is of such flexibility as to preclude injury to the dial mechanism in the event the handle 10 is abruptly released or the turning load should fall by virtue of a rupture in the nut or bolt or other instrumentality that is being tightened. The rather flexible rod 46—51 would absorb a substantial part of the shock without permitting such to damage the dial mechanism or any part thereof under abnormal conditions of abrupt release. Then, too, the pointer 66 is frictionally mounted on the stud shaft 65 for rotation relative to or therewith.

This enables resetting of the dial indicator pointer 66 relative to the pin 70 prior to applying a wrench to an instrumentality that is to be turned therewith. Any abrupt release of the nut turning load even though the comparatively flexible rod 46—51 would be unable to absorb the entire shock owing to back-lash, would result in the pointer 66 striking the pin 70 and allowing the pinion stud shaft 65 to be rotatively displaced relative to the pointer 66 without injury thereto in the elongated dial actuator rod 46—51. Any back-lash occasioned by the abrupt accidental release of the turning load would ordinarily jar, impair and render permanently defective the measuring instrumentalities.

This can be largely overcome by the actuator rod extension 51 which is highly flexible, resilient and possessed of only sufficient rigidity to overcome the measuring instrumentalities connected thereto. Consequently, the severe stress and strains resulting from any back-lash action, will be absorbed for the most part by the flexing of the actuator rod extension 51 and thus protect the measuring instrumentalities in any type of beam device under such abnormal conditions of abusive operation. The steel spring wire 51 is sufficiently rigid to carry the comparatively small load involved in actuating the indicator instrumentalities without any flex therein and yet sufficiently resilient to absorb any shock created in the abnormal operation of the turning head or revoluble member 30.

Then, too, the torsional displacement in a torsion-type wrench embodying a comparatively short load turning shank 34, is comparatively small in that the degree of twist therein would be a minute amount approximating five thousandths of an inch under normal loads. Because the elongated rod 46—51 actuates the dial mechanism at its (rod 46—51) point of maximum displacement, this minute torsional displacement of the load carrying shank 34 is appreciably translated and accentuated at the dial end of the actuator rod 46—51. Even though there was an abrupt release of load, therefore, the backlash in the aforesaid structure would be negligible and the actuator rod 46—51 would not be called upon to withstand any appreciable back-lash shock which could, however, be absorbed by the resilient actuator extension 51 which is preferably constructed from small diameter spring steel wire.

With the arrangement of parts above described, it will be apparent that a very simple, inexpensive and highly accurate torque measuring wrench has been provided wherein there are few moving parts and the friction thereof has been reduced to a minimum to preclude variable and inaccurate readings. These features coupled with the fact that the torsional stress created by the turning load is measured at the point of maximum displacement of the elongated dial mechanism actuator rod, eliminates or reduces to a negligible minimum any inaccuracies even at small loads.

Various changes may be made in the embodiment of the invention herein specifically described without departing from or sacrificing any of the advantages of the invention or any features thereof, and nothing herein shall be construed as limitations upon the invention, its concept or structural embodiment as to the whole or any part thereof except as defined in the appended claims.

I claim:

1. In a torque wrench, the combination with an elongated handle member, of a torsion responsive work engaging head member fixed to one extremity of said handle member and adapted to twist in response to torque, an elongated rod anchored only at one extremity to said head member and extending freely along said handle member without connecting therewith nor sustaining the work resisting load of said head member, and calibrated indicating means fixed proximate to the other extremity of said elongated handle member for operative connection to the other extremity of said elongated rod to measure the twist of said head member responsive to sustaining a turning load with a turning force applied to said handle member.

2. In a torque wrench, the combination with an elongated rigid handle member, of a work engaging head member anchored to said handle member proximate to one extremity thereof, an elongated rod anchored only at one extremity to said work engaging head member at a point spaced from its anchorage to said handle member to extend freely along said handle member without connecting therewith, and torque indicating means mounted proximate to the other extremity of said handle member for operative connection to the free extremity of said elongated rod to determine the degree of twist in said work engaging head member between the anchorage points of said elongated handle and rod.

3. In a torque wrench, the combination with an elongated rigid handle member, of a work engaging turning head member anchored in one end of said rigid handle member to extend normal thereto, a casing complemental to said rigid handle member, a torque resisting shank on said work engaging turning head member projecting through said casing, and an elongated rod radially anchored to said torque resisting shank at a point spaced from the latter's anchorage to said rigid handle member to freely extend therealong without connecting therewith, and calibrated indicating means on said handle member positioned laterally of said work engaging turning head member for operative connection to the free extremity of said elongated rod to measure the degree of twist in said torque resisting shank occasioned in sustaining turning loads imparted by said work engaging member.

4. In a torque wrench, the combination with a handle member, of a work-engaging turning head member anchored in one end of said rigid handle member, a casing complemental to said rigid handle member, a torque resisting shank on said work engaging turning head member projecting through said casing, said work engaging turning head member extending normal to said handle member and casing, an elongated rod radially anchored only at one extremity to said torque resisting shank at a point spaced from its anchorage to said rigid handle member for free extension along said handle member and casing without connecting therewith, a flexible shock resisting extension on said rod, and calibrated indicating means on said handle member positioned laterally of said work engaging turning head member for operative connection to the free extremity of said flexible extension to measure the degree of twist in said torque resisting shank occasioned in sustaining turning loads imparted by said work engaging member.

5. In a torque wrench, the combination with a handle member including a casing, of a rigid cover plate attached to said handle member casing, a torsion resisting work engaging head member projecting through the casing of said handle member and anchored at right angles to said rigid cover plate, an elongated rod anchored at one extremity thereof to extend normal to said work engaging member at a point spaced from its anchorage to said rigid cover plate, said elongated rod extending along said rigid cover plate for confinement by said casing without connecting with said cover plate and casing, and torque indicating means on said handle member positioned laterally of said work engaging turning head member for operative connection to the free extremity of said rod which is displaced responsive to applying force to said rigid cover plate through said handle member.

6. In a torque wrench, the combination with a handle member including a casing, of a rigid cover plate attached to said handle member casing, a torsion resisting work engaging head member projecting through the casing of said handle member and anchored at right angles to said rigid cover plate, an elongated rod anchored at one extremity thereof to extend normal to said work engaging member at a point spaced from its anchorage to said rigid cover plate, a comparatively flexible shock absorbing extension on said rod, said elongated rod extending along said rigid cover plate for confinement by said casing without connecting with said cover plate and casing, and torque indicating means on said handle member positioned laterally of said work engaging turning head member for operative connection to the free extremity of said flexible rod extension which is displaced responsive to applying force to said rigid cover plate through said handle member.

7. In a torque wrench, the combination with a handle member including a rigid non-yielding plate, of a torsion resisting work engaging turning head anchored in said handle member proximate to one end thereof, said work engaging head member having a uniform shank extending normal to said handle member, an elongated rod anchored at one extremity thereof to said head member shank at a point spaced from its anchorage to said handle member, said elongated rod extending longitudinally of said handle member, said elongated rod terminating in a free extremity proximate to the end of said handle member opposite to said work engaging head member, and torque indicating means on said handle member for operative connection to the free extremity of said elongated rod which is displaced responsive to applying force to said handle member.

8. In a torque wrench, the combination with a handle member including a rigid non-yielding plate, of a torsion resisting work engaging turning head member anchored in said handle member proximate to one end thereof, said work engaging head member having a uniform shank extending normal to said handle member, an elongated rod anchored at one extremity thereof to said head member shank at a point spaced from its anchorage to said handle member, said elongated rod extending longitudinally of said handle member, said elongated rod terminating in a free highly flexible extremity proximate to the end of said handle member opposite to said work engaging head member, and torque indicating means on said handle member for operative connection to the free flexible extremity of said elongated rod which is displaced responsive to applying force to said handle member.

9. In a torque wrench, the combination with a handle member including a rigid non-yielding plate, of a torsion resisting work engaging turning head member anchored in said handle member proximate to one end thereof, said work engaging head member having a uniform shank extending normal to said handle member, an elongated rod anchored at one extremity thereof to said head member shank at a point spaced from its anchorage to said handle member, said elongated rod extending longitudinally of said handle member, said elongated rod terminating in a longitudinally adjustable and free highly flexible extremity proximate to the end of said handle member, and torque indicating means on said handle member for operative connection to the free flexible extremity of said elongated rod which is displaced responsive to applying force to said handle member, said elongated rod and flexible extremity being sufficiently rigid to actuate said torque indicating means and sufficiently yielding to absorb back-lash occasioned by an abrupt load release on said work engaging turning head member.

10. In a torque wrench, the combination with a chambered handle member, of a torsion resisting work engaging turning head member projecting through said handle member proximate to one end thereof, a rigid non-yielding cover plate for said chambered handle member, said work engaging head member having a shank anchored at right angles to said rigid cover plate near one extremity thereof, an elongated rod anchored at one extremity thereof to said head member and extending normally thereto in said chambered handle member to substantially the opposite end thereof, said elongated rod terminating in a comparatively flexible shock absorbing extension projecting axially from the free extremity of said elongated rod, said flexible rod extension having an offset extremity, torque indicating means operatively connected to the offset extremity of said last named flexible extension which is displaced responsive to applying force to said handle member.

11. In a torque wrench, the combination with a rigid handle member, of a torsion resisting work engaging turning head member having a shank anchored to one extremity thereof and projecting normal thereto for imparting turning movement to said head member through the moment arm of said handle member, an elongated rod anchored to the shank of said head member at a point spaced from said handle member anchorage point thereof, said elongated rod terminating in a free flexible extremity adjacent said handle member proximate to the other extremity thereof, and torque indicating means on said last named extremity of said handle member for operative connection to said flexible extremity of said elongated rod which is displaced responsive to applying force to said handle member.

12. In a torque wrench, the combination with a handle member including a flat rigid plate, of a cylindrical torsion resisting turning head member anchored in said handle member plate to extend normal from one end thereof, elongated rod means anchored at one extremity thereof to said cylindrical head member at a point spaced from said flat plate, said elongated rod means terminating in a free extremity proximate to the other end of said flat rigid plate, and torque indicating means on said handle member for connection to the free extremity of said rod means, said elongated rod means being sufficiently rigid to actuate said torque indicating means and yet comparatively flexible to absorb the shock occasioned by abrupt load release in said turning head member.

13. In a torque wrench, the combination with an elongated rigid handle member, of a torque resisting turning head member anchored at right angles proximate to one extremity of said rigid handle member, torque indicating means attached to said handle member proximate to the other extremity thereof, and means extending in spaced parallelism to said handle member and normal to said turning head member between said turning head member and said torque indicating means to respond to the torsional stress in said turning head member responsive to sustaining a turning load, said parallel extending means being free to swing from said head member to said indicating means without any mounting therebetween.

14. In a torque wrench, the combination with an elongated rigid handle member, of a torque resisting turning head member anchored at right angles proximate to one extremity of said rigid handle member, torque indicating means attached to said handle member proximate to the other extremity thereof, and an elongated rod extending in spaced parallelism to said handle member and normal to said turning head member between said turning head member and said torque indicating means to measure the torsional stress in said turning head member responsive to sustaining a turning load, said elongated rod being sufficiently rigid to actuate said indicating means and sufficiently flexible to absorb shock occasioned in the abnormal operation of said head member.

15. In a torque wrench, the combination with an elongated rigid handle member, of a torque resisting turning head member anchored at right angles proximate to one extremity of said rigid handle member, said turning head member including a shank that resists rotation relative to said handle member to effect a torsional stress therein responsive to sustaining a turning load, torque indicating means attached to said handle member proximate to the other extremity thereof, and means extending in spaced parallelism to said handle member and normal to said turning head member between said turning head member and said torque indicating means to respond to the torsional stress in said turning head member responsive to sustaining a turning load, said parallel extending means being free to swing from said head member to said indicating means without any mounting therebetween.

16. In a torque wrench, the combination with an elongated rigid handle member, of a torque resisting turning head member anchored at right angles proximate to one extremity of said rigid handle member, torque indicating means attached to said handle member proximate to the other extremity thereof, and an elongated rod extending in spaced parallelism to said handle member and normal to said turning head member between said turning head member and said torque indicating means to measure the torsional stress in said turning head member responsive to sustaining a turning load, said elongated rod being longitudinally adjustable to provide for variations in the calibration of the indicating means to insure accuracy.

17. In a torque wrench, the combination with a rigid handle member, of a torque resisting work engaging turning head member anchored at one extremity to said handle member and projecting normal thereto for imparting a turning movement therewith, the other extremity of said work engaging turning head member being adapted to engage work to impart turning movement thereto, an elongated torsion translating rod anchored only at one extremity to said work engaging turning head member at a point spaced from said handle member anchorage point thereof, said elongated rod extending substantially radially of said turning head member and parallel along said handle member, and torque indicating means attached to said handle member for operative connection to the other extremity of said elongated rod which is displaced without flexing responsive to applying force to said handle member to operate said indicating means, said elongated rod being free to swing from said turning head member to said indicating means without any mounting therebetween.

18. In a torque wrench, the combination with a rigid handle member, of a torque resisting work engaging turning head member anchored at one extremity to said handle member proximate to one end thereof and projecting normal thereto for imparting a turning movement therewith, the other extremity of said work engaging turning head member being adapted to engage work to impart turning movement thereto, an elongated torsion translating rod anchored at one extremity to said work engaging turning head member at a point spaced from said handle member anchorage point thereof, said elongated rod extending substantially along said handle member, and torque indicating means attached to said handle member near the other end thereof for operative connection to the other extremity of said elongated rod which is displaced without flexing responsive to applying force to said handle member to operate said indicating means.

19. In a torque wrench, the combination with a rigid handle member comprising a flat rigid load bearing plate and a casing detachably connected therewith, of a torque resisting work engaging turning head member anchored at one extremity to said handle member bearing plate and projecting normal through said handle member casing for imparting a turning movement therewith, the other extremity of said work engaging turning head member being adapted to engage work to impart turning movement thereto, an elongated torsion translating rod anchored at one extremity to said work engaging turning head member at a point spaced from said handle member anchorage point thereof, said elongated rod extending substantially along said handle member, and torque indicating means attached to said handle member for operative connection to the other extremity of said elongated rod which is displaced without flexing responsive to applying force to said handle member to operate said indicating means.

20. In a torque wrench, the combination with a rigid handle member comprising a flat rigid load bearing plate and a casing detachably connected therewith, of a torque resisting work engaging turning head member anchored at one extremity to said handle member bearing plate proximate to one end thereof and projecting normal through said handle member casing for imparting a turning movement therewith, the other extremity of said work engaging turning head member being adapted to engage work to impart turning movement thereto, an elongated torsion translating rod anchored at one extremity to said work engaging turning head member at a point spaced from said handle member anchorage point thereof, said elongated rod extending substantially along said handle member, and torque indicating means attached to said handle member near the other end thereof for connection to the other extremity of said elongated rod which is displaced without flexing responsive to applying force to said handle member to operate said indicating means.

KENNETH R. LARSON.